P. BRINKERHOFF.
Liquid Measure.
No. 65,335. Patented July 4, 1867.
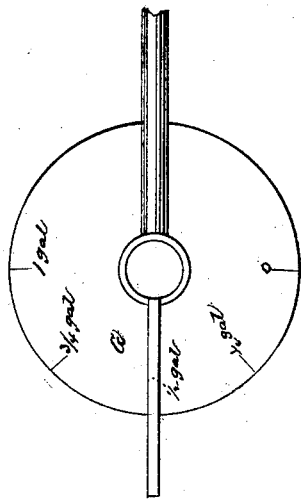
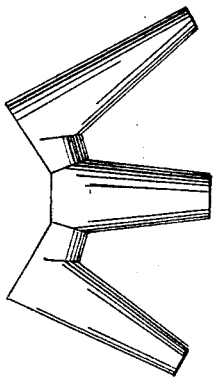
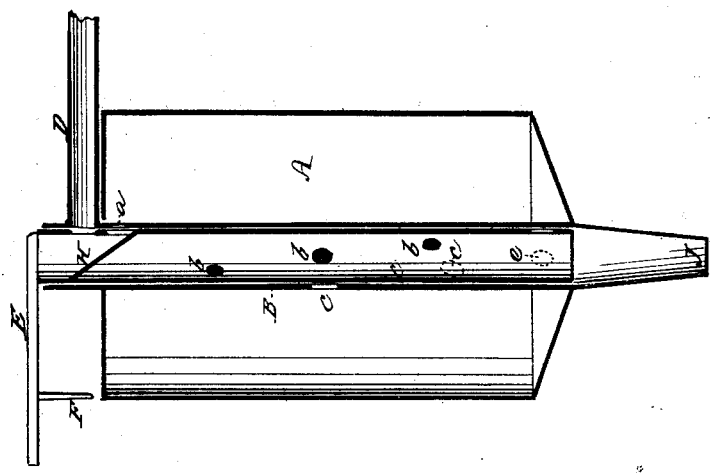

United States Patent Office.

PARCEL BRINKERHOFF, OF CHILLICOTHE, MISSOURI.

Letters Patent No. 65,335, dated June 4, 1867.

---

IMPROVED MEASURE FOR LIQUIDS.

---

The Schedule referred to in these Letters Patent and making part of the same.

---

TO ALL WHOM IT MAY CONCERN:

Be it known that I, PARCEL BRINKERHOFF, of Chillicothe, in the county of Livingston, and State of Missouri, have invented a new and useful Improvement in Measuring Liquids; and I do hereby declare that the following is a full, clear, and exact description thereof.

The object of my invention is to furnish a simple and portable vessel by which liquids can be measured from a barrel or reservoir without resorting to different-sized measuring cups for that purpose, and also in discharging the said liquids into any receptacle, as jugs, bottles, or vials, as may be desired; and the invention consists in arranging a receiving vessel with interior tubes and apertures in such a manner that by simply turning a tube within the receiving vessel, any given quantity of liquid will be measured and discharged therefrom.

And to enable others skilled in the art to make and use my invention, I will proceed to describe its construction and operation, reference being had to the accompanying drawings, forming a part of this specification, and to the letters of reference marked thereon.

Figure 1 represents a vertical section of my measuring instrument, showing the internal arrangement.

Figure 2 is a top view showing the supply pipe, index-lever, and index-plate.

Figure 3 shows the nozzle or different-sized tips joined together.

Similar letters indicate corresponding parts.

A is the receiving vessel. B is an interior tube attached to the receiving vessel. C is a tube within B and indicated by red lines. D is the supply pipe. E is the index-lever. F is the index-point, and G (which forms the top of the receiving vessel) is the index-plate. H is a partition in tube C. The supply pipe D conducts the liquid from the barrel or other vessel into the tube C above the partition H, from whence it runs into the receiving vessel A. There are apertures through the tube C (near the top) which correspond with the supply pipe, and with an aperture, $a$, through the tube B for this purpose. There are other apertures or holes through the tube C below the partition, as seen at $b\ b\ b$, placed spirally in the tube, as seen in the drawing. There are holes through the tube B, also placed spirally, and indicated by $c\ c\ c$. The index-lever E is fast to the top of the tube C, and the tube C is rotated within the tube B by the lever. The index-finger F is attached to the lever. The index-plate G is spaced off, indicating one-fourth, one-half, three-fourths, and one gallon, and the receiving vessel A contains the largest quantity indicated on the plate. Only one set or pair of holes (that is one $b$ and one $c$) are in communication with the vessel A at the same time. When the tube C is turned by the lever E, so that the lower pair of holes, for instance, is in communication with the vessel A, all the other apertures are closed, and the holes through the tubes, being arranged spirally, as before mentioned, only one pair of holes can discharge liquid at the same time, although the vessel A may be full, so that when there is liquid sufficient to fill the vessel all there is to do is to turn the index-point to the desired quantity, and it is at once discharged. Fig. 1 shows the central tube in combination with the barrel or vessel by means of the tube D. The vessel A will be filled with the liquid, and, as in the present case, will hold a gallon. If this quantity is desired the index is turned a half revolution to register therewith, and the entire contents will pass out at the nozzle, by means of the lowest opening in the tube B registering with the lowest opening in tube C. If three-fourths of a gallon are desired the index is turned three-eighths of a revolution, when the second lowest opening in the central tube will register with the corresponding opening in tube B, then three-fourths of the fluid will pass out, leaving one-fourth in the vessel A. If one-half gallon is needed the central openings in B and C will register when the index makes a quarter revolution, then one-half of the fluid will pass out, and so on with the fractional parts of the measure, according as it is graduated.

To make it convenient to discharge liquid into different kinds of vessels, as jugs, bottles, or vials, I have provided different-sized nozzles or tips, which fit on to the bottom of the discharge at J. For convenience, and to prevent the loosing or displacement of the tips, they are formed in one piece, as seen in fig. 3.

As the chief novelty of my measuring instrument consists in the arrangement of the receiving vessel and the interior tubes with their apertures, I do not confine myself to the particular manner of construction above described. The interior tube C may be arranged so as to be elevated and depressed within the vessel A, and the quantities to be discharged may be indicated on the side of the tube instead of on an index-plate. There may be other modifications made without materially affecting my method. But I prefer the method of construction described above.

Having thus described my invention, what I claim as new, and desire to secure by Letters Patent, is—

The central tube C, having index-levers E F, spirally-arranged perforations $b$, in combination with the tube B of the vessel A, having corresponding perforations and graduated top G, and operating substantially as described for the purpose specified.

The above specification of my invention signed by me this 27th day of September, 1866.

PARCEL BRINKERHOFF.

Witnesses:
  A. A. MINNIEAR,
  F. L. SHADE.